United States Patent [19]

Novak

[11] Patent Number: 5,448,505
[45] Date of Patent: Sep. 5, 1995

[54] FEED THROUGH DIMENSIONAL MEASUREMENT SYSTEM

[75] Inventor: Ronald E. Novak, Seattle, Wash.

[73] Assignee: The Boeing Company, Seattle, Wash.

[21] Appl. No.: 157,792

[22] Filed: Nov. 24, 1993

[51] Int. Cl.$^6$ .......................... G01B 5/06; G01B 5/04
[52] U.S. Cl. ...................... 364/563; 33/503; 33/504; 33/505; 33/783; 364/560
[58] Field of Search ............. 33/503, 504, 505, 783; 364/560, 563

[56] References Cited

U.S. PATENT DOCUMENTS

| | | | |
|---|---|---|---|
| 2,474,117 | 6/1949 | Rendel | 72/9 |
| 2,484,623 | 10/1949 | Heising | 73/630 |
| 3,045,510 | 7/1962 | Brainard | 408/3 |
| 3,164,909 | 1/1965 | Rosenberg | 33/568 |
| 3,165,834 | 1/1965 | Benton | 33/503 X |
| 3,206,857 | 9/1965 | Kaye | 33/503 |
| 3,226,833 | 1/1966 | Lemelson | 33/783 |
| 3,241,243 | 3/1966 | Speer | 33/503 |
| 3,250,012 | 5/1966 | Hilton et al. | 33/505 |
| 3,377,713 | 4/1968 | Schiler | 33/503 |
| 3,384,970 | 5/1968 | Avalear | 33/503 |
| 3,386,174 | 6/1968 | Leach et al. | 33/503 |
| 3,509,635 | 5/1970 | Meinke | 33/561 |
| 3,531,868 | 10/1970 | Stevenson | 33/503 |
| 3,562,918 | 2/1971 | Ertman et al. | 33/174 |
| 3,775,854 | 12/1973 | Hofelt, Jr. et al. | 33/174 R |
| 3,875,667 | 4/1975 | Wilke | 33/174 L |
| 3,878,984 | 4/1975 | Sotiropoulos et al. | 364/560 |
| 3,902,249 | 9/1975 | McClughan | 33/174 L |
| 4,138,821 | 2/1979 | Wilks | 33/174 Q |
| 4,255,862 | 3/1981 | Nakamura | 33/503 |
| 4,503,617 | 3/1985 | Chevrier et al. | 33/503 |
| 4,621,532 | 11/1986 | Takagi et al. | 73/623 |
| 4,805,309 | 2/1989 | Koike | 33/147 |
| 4,974,333 | 12/1990 | Ginzburg | 33/783 |
| 5,050,121 | 9/1991 | Hedglen et al. | 364/560 |
| 5,339,260 | 8/1994 | Miura | 364/560 |
| 5,352,393 | 10/1994 | Joseph | 364/560 X |

*Primary Examiner*—Edward R. Cosimano

[57] ABSTRACT

A feed-through dimensional measurement system for gathering crossectional measurement data from an elongated part and correlating that data with the longitudinal position on the part from which the data was measured. The system includes a measurement apparatus supported on a part support stand having measuring instruments coupled to a central processing unit for recording and correlating the measurement data. A part drive system drives the part through a transport zone on the support stand while a clamping roller module holds the part against two orthogonal planes established by a set of rollers in the transport zone. Web thickness is measured in relation to a vertical reference plane established by one set of the rollers, and part height and warpage is measured with reference to the orthogonal reference plane. A flatness measurement module and a flange width measurement module provide additional digital dimensional signals to the central processing unit that is programmed to store the measurement data and to graphically display the measured dimensions in relation to the part's designed dimensions.

23 Claims, 14 Drawing Sheets

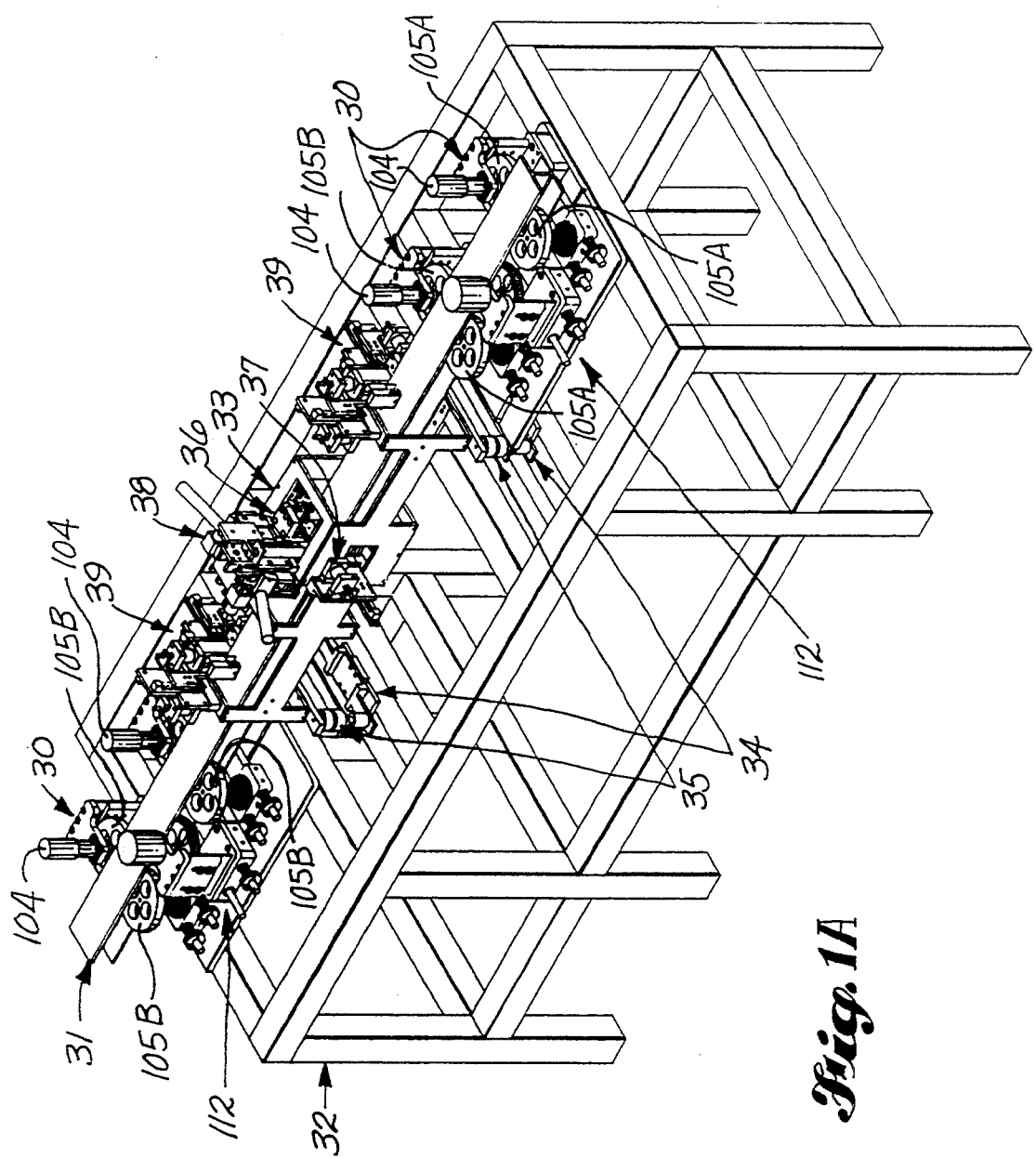

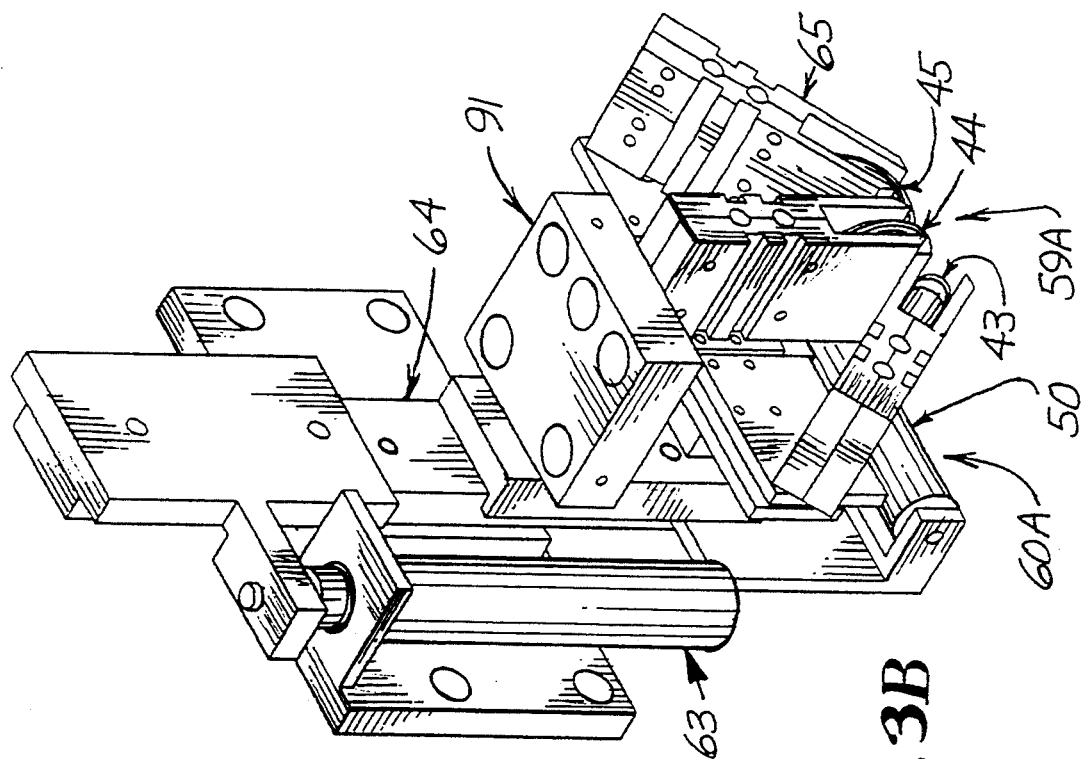
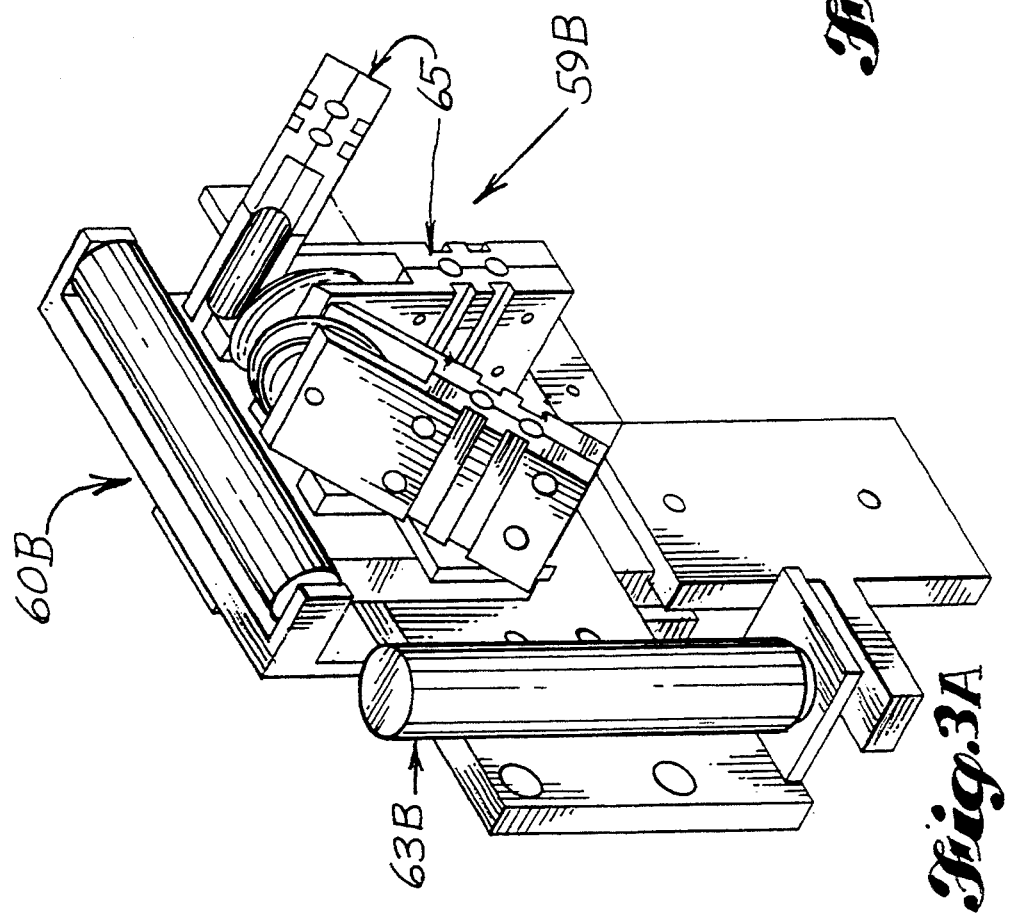

FEED THROUGH DIMENSIONAL MEASUREMENT SYSTEM

BACKGROUND OF THE INVENTION

This invention relates to measuring the dimensions of an elongated part, and more particularly to a measuring apparatus capable of accurately correlating the cross sectional measurements to the longitudinal location on the part. Additionally, this invention relates to a method for easily comparing measurement data to the designed dimensions of the part, thus greatly simplifying part inspection.

The need to produce elongated structural parts that closely conform to designed parameters occurs throughout the aerospace industry as well as in other industries. These parts may either be simple constant cross section extrusions or more complex compound contour cross sections that taper from end to end and have precise notch or tab features. Further, these parts may be made of metal, such as aluminum, of composites such as graphite-epoxy, or of other rigid materials.

Part measuring technology has evolved considerably and has produced several useful devices for measuring constant cross section parts. See, e.g., Kioke, U.S. Pat. No. 4,805,309. Systems have been developed which move a part past a dimensional sensor and measure the part's maximum dimension passing the sensor. See, e.g., Hofelt, Jr. et al., U.S. Pat. No. 3,775,854. However, a method for accurately measuring multiple dimensions of the complex shaped parts found in airplanes has typically been very labor intensive. Additionally, prior measuring processes for such parts have suffered from measuring inaccuracies that often exceeded the part's dimensional tolerances. Methods exist for measuring some dimensions of constant cross section parts, but a preferable system would precisely measure variations in cross section and correlate the measurements with the longitudinal position of the part.

For example, on a typical "I" section airplane wing stringer having a compound contour with tabs on the upper flange, the tabs must be located accurately from the stringer's end within a small tolerance. To check these dimensions, operators manually measured the tab location by first placing a pair of shape templates against the part tab and, using a flexible measurement instrument such as a tape measure, measuring the distance from the point at which these templates intersect to the end of the stringer. Because different people position the templates against the tab slightly differently, and because the tape measure only approximates the compound contour of the part, repeatability in measuring a model part was sometimes outside the part's dimensional tolerance. A better system would allow precise measurement along the part's longitudinal axis, irrespective of contour, and would allow precise, repeatable measurement of part cross sectional features correlated to longitudinal position along the part.

Recording the measured dimensions has typically required the operator to read an analog gauge and record the measurement. Some measuring systems have improved on this by creating a digital output. See, e.g., Wilke, U.S. Pat No. 3,875,667. Further improvement in measurement technology made possible converting analog displacements to digital pulses suitable for computer manipulation for part classification requirements. See, e.g., Hofelt, Jr. et al., U.S. Pat. No. 3,775,854. A superior system would measure the member, create a digital record of the part measurements, and then graphically display the measured dimensions in a visual context such as a video monitor allowing even new users to immediately identify out of tolerance parts, and also allow the user to easily locate dimensional discrepancies on the part.

Thus, it would be desirable to create a measuring system that could continuously measure the cross sectional dimensions of a part in relation to its lengthwise position. Additionally, it would be very useful if the measured dimensions could be both graphically represented in relation to the part's desired dimensions in a user friendly format on a video monitor, and also stored for future reference.

SUMMARY OF THE INVENTION

Accordingly, an object of this invention is to provide an improved system and method for measuring parts, and an improved measurement presentation system and method for using measurement information.

Another object of this invention to provide an improved system for accurately measuring the cross sectional width, thickness, flatness, and angularity of upper and/or lower flanges of an elongated part and accurately indicating changes in these cross sectional dimensions relative to their precise longitudinal location on the part.

Still another object of this invention is to provide an improved system for accurately measuring the cross sectional height, thickness, and flatness of the web of an elongated part and accurately defining changes in these cross sectional dimensions relative to the precise longitudinal location on the part.

A further object of this invention is to automatically measure part cross sectional dimensions as the part moves through the measuring system.

Yet another object of this invention is to provide an apparatus and method that offers improved measurement analysis by visually displaying measurements taken from a part in comparison to both the part as designed and to dimensional limits on the part as designed.

Still a further object of this invention is to provide for measured dimension data storing and retrieval of previously measured parts of the same design for statistical analysis or other purposes.

These and other objects of this invention are attained in the preferred embodiments disclosed herein of a feed-through dimensional measurement system having a central processing unit, a part support stand, and a measurement apparatus wherein there is a part drive system, a clamping roller module, a flatness measurement module, and a flange width measurement module, with the measurement modules providing digital dimensional signals to the central processing unit that is programmed to store the measurement data and to graphically display the measured dimensions in relation to the part's designed dimensions.

DESCRIPTION OF THE DRAWINGS

The invention and its attendant objects and advantages will become more clear upon reading the following description of the preferred embodiment in conjunction with the following drawings wherein:

FIG. 1A is an isometric view of the apparatus and supporting structure for part measurement.

FIGS. 3A and 3B are isometric views of the upper and lower 3-point angularity sensors and 2 point web thickness sensor shown in FIG. 1, which together make up the flatness measurement module;

DESCRIPTION OF THE PREFERRED EMBODIMENT

Figure 1B:
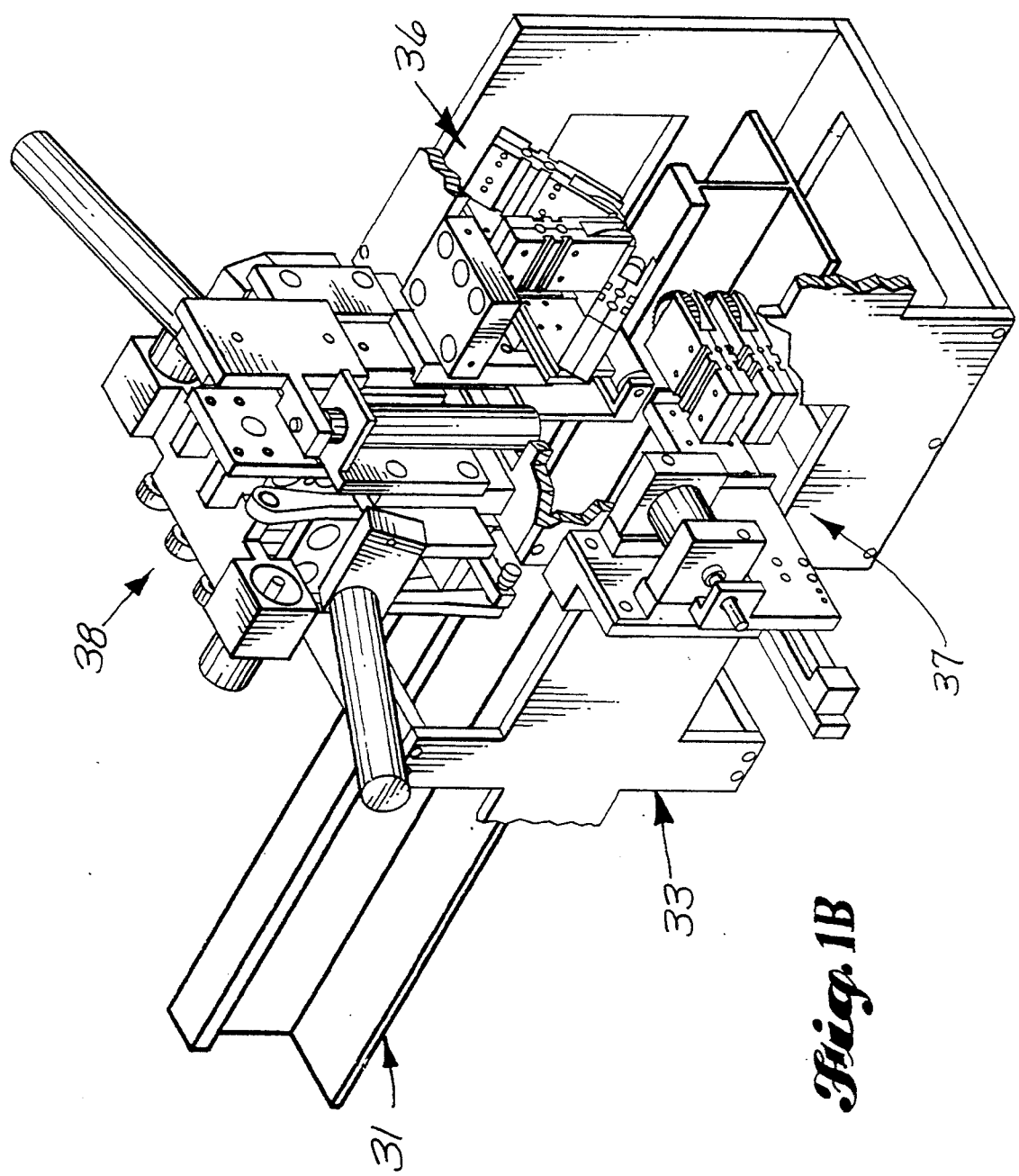
FIG. 1B is an enlarged isometric view of the measurement modules in the apparatus shown in FIG. 1.

Turning now to the drawings, wherein like reference characters designate identical or corresponding parts, and more particularly to FIG. 1A thereof, a measurement system in accordance with this invention is shown for performing quality control inspection of elongated structural parts, such as commercial airplane composite wing stringers. A stringer, hereinafter referred to as a "part" 31, is shown in FIG. 1 resting on rollers on a central frame 33, supported in turn on two spaced support platforms 34 mounted on a stand 32 and being driven with drive units 30 past inspection modules attached to the frame 33. The supporting stands 34 use springs 35. The inspection modules are all in a transport zone, defined as the region between the drive units 30 at opposite ends of the stand 32, and the inspection modules include location devices for establishing data planes, and dimensional sensing instruments for sensing longitudinal movement of the part 31 and displacement of selected surfaces of the part from the data planes. Springs 35 support the frame 33 on the platform 34, allowing the frame 33 to move with the part 31 if the part 31 has axial twist or bow. The measurement system's primary modules, shown assembled on the frame 33 in FIG. 1B, include a flatness measurement module 36, a web thickness measurement module 37, a flange width measurement module 38. FIG. 1A also shows two clamping modules 39, one each located at either end of the frame 33, as well as encoder modules 112, and the drive units 30.

As used herein, the term "module" refers to a unit attached directly to the frame 33 or the support platform 34. A "sensor" is part of a module and provides a rigid attachment for a "probe". The "probe" is the element that detects the surface of the part and produces signals indicative of the surface position relative to the probe position.

Figure 2:
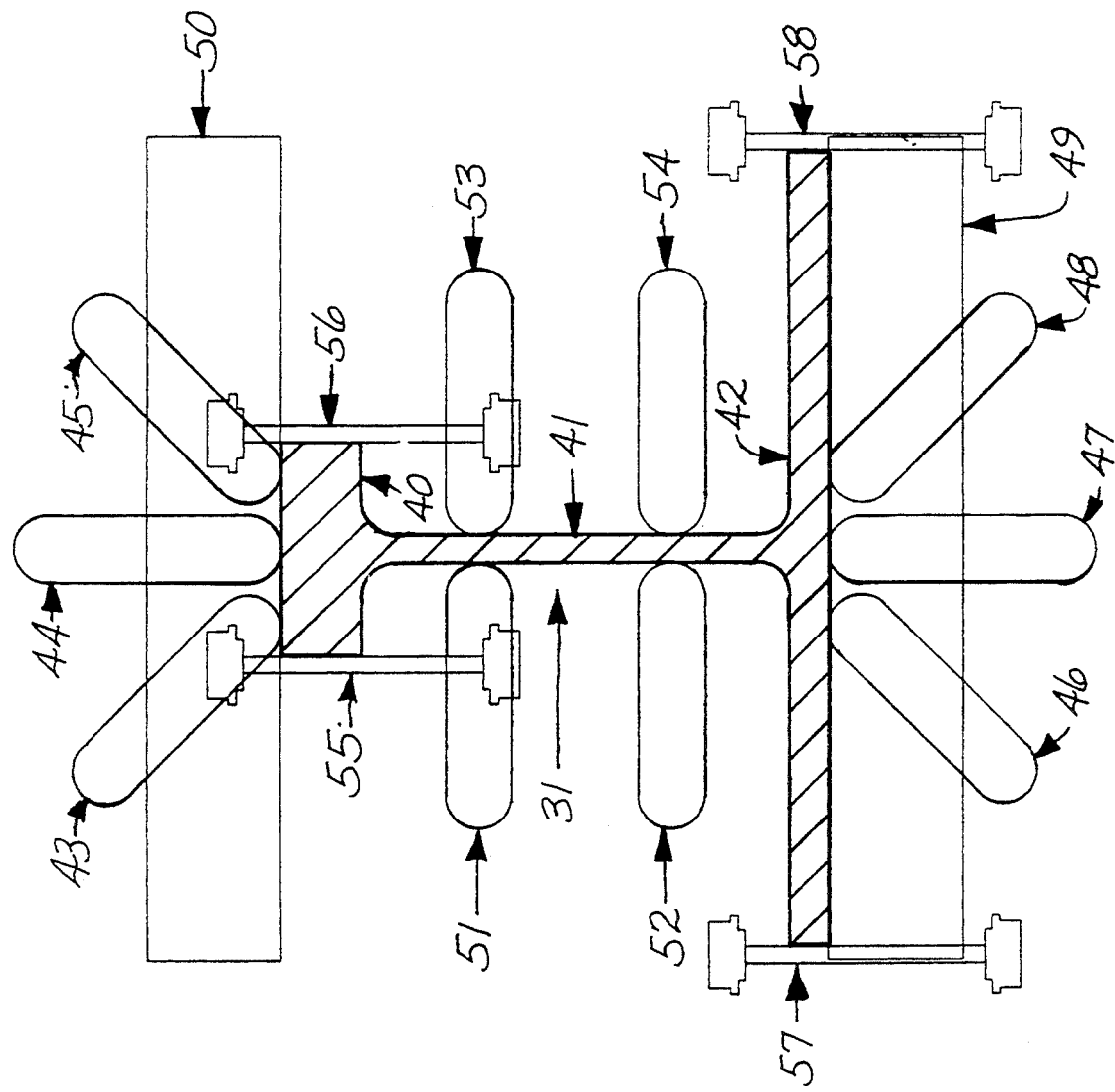
FIG. 2 is an end view of a part in cross section showing all measurement module to part contact points.

The measurement modules together create a digital image of the cross section of the part 31 by recording sixteen distinct dimensional parameters from a typical "I" cross section part 31 as shown in FIG. 2. This figure shows the sixteen probe contact surfaces of both the flatness measurement module 36, the web thickness measurement module 37, and the flange width measurement module 38 superimposed on a single part 31 cross section. The "I" section member 31 can be thought of as being composed of an upper flange 40, a web 41, and a lower flange 42. To measure for distortion of either side of a flange 40 or 42 of the part 31, the system measures the angularity of the flanges 40, 42 by comparing the height measurement of probes 43 or 45 to the height measurement of the center probe 44, or for the lower flange 42, the height measurement of probes 46 or 48 to the height measurement of the center probe 47.

Probes 49 and 50 allow measurement of the localized vertical translation of the part 31, as well as its height variation. Measuring the difference between probes 49 and 50 determines height variation. Localized translation is slightly more complex and requires viewing FIG. 2 with FIG. 1B. The roller clamp modules 39 constrain the lower flange 42 of the part 31 from moving vertically relative to the frame 33 at the frame's 33 ends. Because these modules 39 create a theoretical plane through the frame 33, measuring the distance from the plane to probe 50 defines the bow of the part 31 over its length.

Probes 51, 52, 53, and 54 are used to measure web 41 thickness and lateral translation of the part 31. Web 41 thickness is the difference between probe 51 and 53 or between probe 52 and 54. Viewing FIG. 2 with FIG. 1B will assist understanding how the system measures lateral translation. The roller clamp modules 39 constrain the web 41 surface that probes 53 and 54 contact from moving horizontally at either end of the frame 33. Measuring the displacement of 53 and 54 from the plane in which the clamping modules 39 lie determines the lateral translation of the part 31.

Probes 55, 56, 57, and 58 are used to measure the width of the upper 40 and lower 42 flange. The width of the upper flange 40 is calculated by measuring the difference between probes 55 and 56. Similarly, the width of the lower flange 42 is calculated by measuring the difference between probes 57 and 58.

Figure 4:
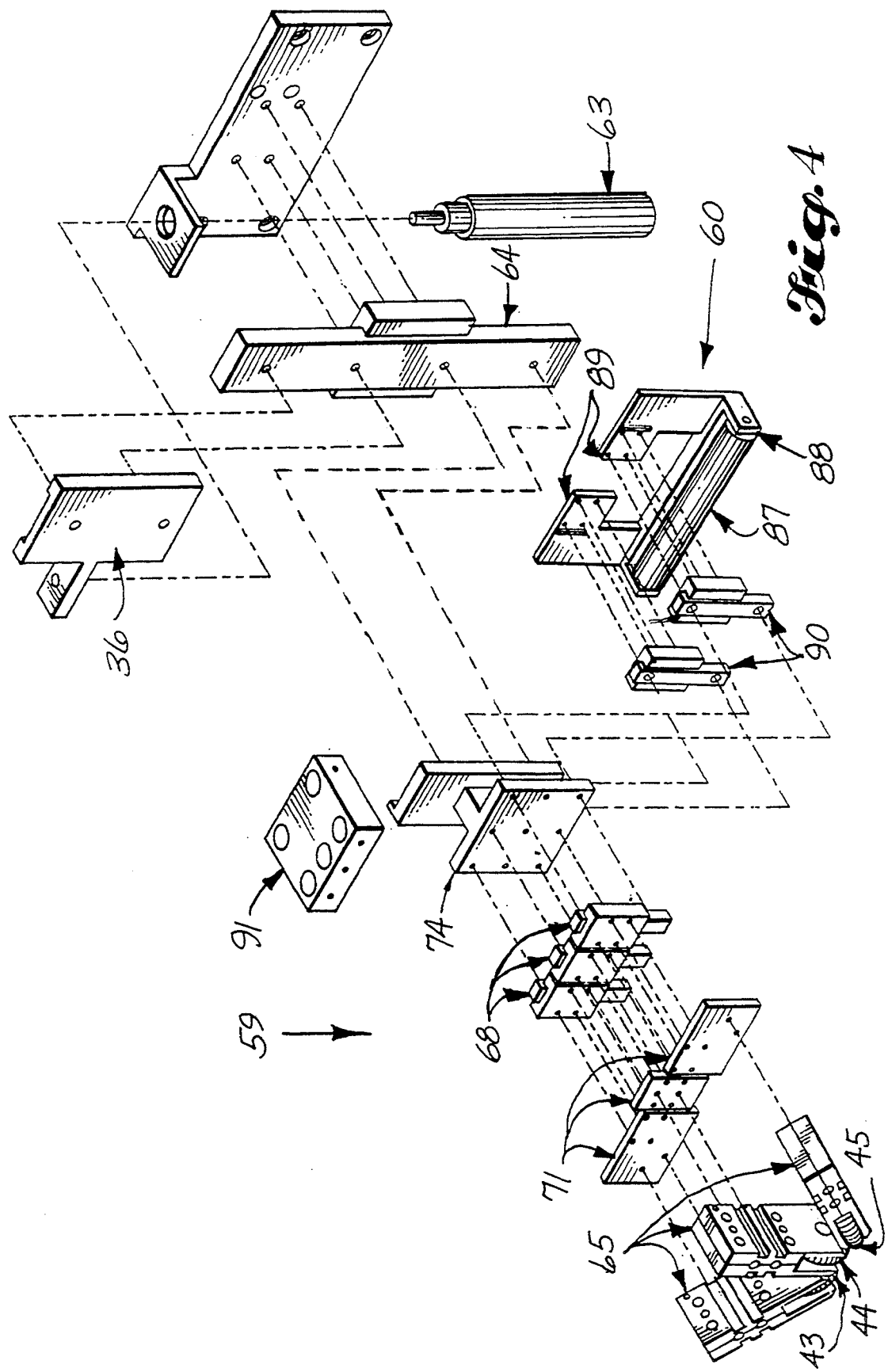
FIG. 4 is an exploded isometric view of the flatness measurement module shown in FIGS. 3A and 3B.

By understanding what dimensions the system can measure as shown in FIG. 2 and described above, it is easier to understand how the mechanisms shown in FIGS. 3 through 7 and described below measure those dimensions. As shown in FIGS. 3A and 3B, several sensors comprise the flatness measurement module 36. Four fasteners rigidly attach the module 36 to the frame 33. The module 36 is thus readily removable for maintenance or replacement as a complete assembly. The flatness measurement module 36 has four primary sensors; two flange angularity sensors 59A (upper) and 59B (lower), and two longitudinal flatness sensors 60A and 60B. FIG. 4 shows these sensors in more detail. FIG. 1B also shows a web thickness module 37, which contacts the part 31 in the same cross sectional plane as the angularity sensor 59. The longitudinal flatness sensor 60 contacts the part 31 near the point at which the angularity sensors 59 contact the part 31 as shown in FIG. 3. The dimension between the angularity sensor 59 and flatness sensor 60 need be no particular dimension; however, accurately knowing this dimension allows the data processing algorithms to manipulate the data and relate all information relevant to a single part 31 cross sectional plane. It is also desirable to keep sensor contact locations relatively close and centered between the clamping roller modules 39 so that non-planar lateral and vertical member 31 displacements affect all sensors similarly.

The angularity sensors 59 are held clear of the path of the part 31 while it is being fed through the frame 33. An infra red vision sensor (not shown) is positioned just beyond the point where the angularity sensor 59 contacts the part 31. Once the part 31 has passed the infra red sensor, the sensor triggers pressure reversal in the pneumatic cylinders 63 and 63B applying pneumatic force to drive the angularity sensor 59 toward the member 31 along carriage tracks 64, which guide the vertical movement of the flatness module table 74 and the sensor 59. The three angularity probes 43, 44, 45, shown in FIG. 4, are then in contact with the part 31 partially compressing the springs (not shown) in the individual probe tracks 68.

The springs in the individual probe tracks 68 allow the probes 43, 44, 45 to move up and down with undulations in the part 31. The length of these tracks 68 define the range of measurable variation in the angularity of the flanges 40 and 42. The upper and lower angularity sensors 59 shown in FIG. 3 are identical except for location relative to the part 31 and FIG. 4 shows them in more detail. Each angularity sensor 59 has three probes 43, 44, and 45 that may move independently in a vertical direction toward and away from the part 31. The angle of the outer probes 43 and 45 allows them to be both structurally durable and allows close location of their contact points. Probe housings 65 contain each angularity probe 43, 44 and 45. Each housing 65 is attached to a sliding table 71 to create a movable sensor which is biased toward the part 31 by a spring (not shown).

The angularity sensor uses a linear variable differential transformer (LVDT) 66 to create an electronic signal which represents the desired measurements. A bracket (not shown) secures an LVDT housing (not shown) to the sensor table 74. Within the LVDT housing, an LVDT core slides and its position within the housing defines the frequency of the LVDT's output signal. The LVDT core contacts the probe housing 65 and moves with it. Thus, the LVDT 66 creates a signal which corresponds to the movements of the probes 43, 44, and 45 which in turn correspond to changes in the displacement of the part surfaces from the pertinent data planes and the shape of the part 31 at the point where the probes 43, 44 and 45 contact the part 31.

Once the part 31 entirely passes the angularity sensor 59, the probes 43, 44 and 45 roll over the end of the part 31, and the angularity probe springs push them toward the inward end of the angularity probe tracks 68. As the end of the part 31 moves past the infra red vision sensor, this triggers reversal of the pneumatic cylinder 63 linked to the flatness module table 74, and moves the sensor 59 clear of the path of the part 31 along the carriage track 64.

The longitudinal flatness sensor 60 travels along the same carriage 64 as the angularity sensor 59. The same pneumatic cylinder 63 that forces the angularity sensor 59 toward and away from the part 31 also moves the longitudinal flatness sensor 60 away from the part 31.

The longitudinal flatness probe 87 contacts the part 31 near the point where the angularity probes 43 and web thickness probes 79 contact the part 31. Once the previously described infra red vision sensor (not shown) detects a part 31, the pneumatic cylinder 63 applies pressure against the flatness module table 74 forcing the longitudinal flatness sensor 60 toward the part 31.

Two parallel sliding probe tracks 90 attach the longitudinal flatness sensor 60 to the flatness module table 74. The longitudinal flatness probe 87 is substantially as wide as the maximum width of the flanges 40 and 42. Bearings 88 connect the probe 87 to a probe housing 89, which slides in the probe tracks 90. The probe 87 is perpendicular to the motion of the part 31 and in contact with a cross sectional plane of the outer surfaces of the flanges 40 and 42. The bearings 88 allow the probe 87 to roll over the surfaces 40 and 42. Reversing the pressure in the pneumatic cylinder 63 forces the probe 87 toward the part 31 along the probe tracks 90. When the probe 87 is in contact with the part 31, the probe 87 partially compresses the springs (not shown) along the probe tracks 90. LVDT's generate an analog signal representing travel along the tracks 90 by attaching an LVDT housing 91 to the flatness module table 74 and attaching the LVDT core 92 to the probe housing 89. As the probe 87 and its housing 89 undulate with variations in the part 31, the LVDT core slides within the LVDT housing creating an electrical signal that an analog-to-digital processor can convert into a linear measurement.

As the end of the part 31 passes the longitudinal flatness sensor 60, the probe 87 drops off the end of the part 31. The infra red vision sensor (not shown) detects the end, causing the pneumatic cylinder 63 to retract the flatness module table 74, and thereby move the longitudinal flatness probe 87 along the carriage tracks 64 clear of the path of the part 31.

Figure 5A:
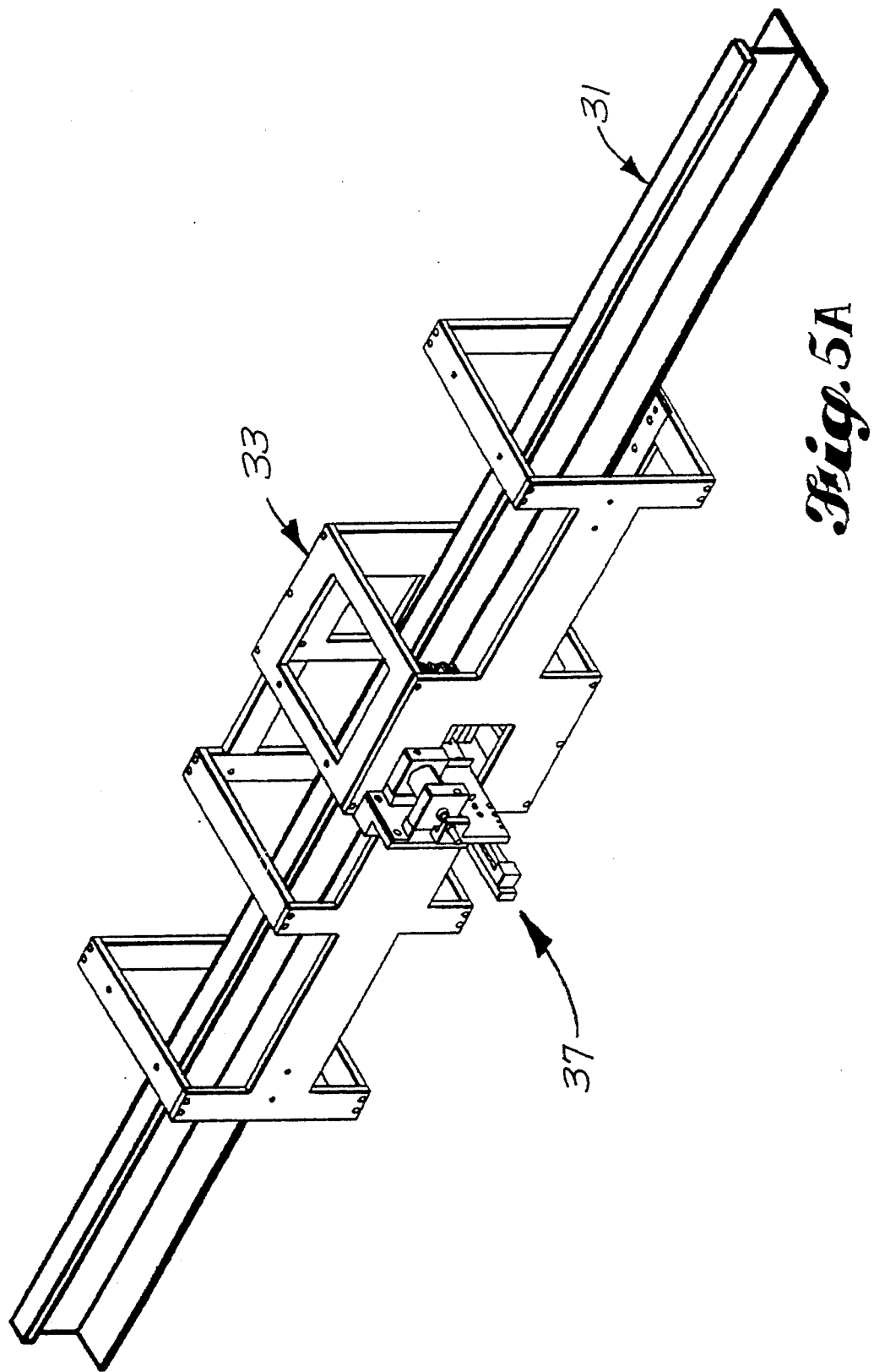
FIG. 5A is an isometric of the web thickness measurement module shown in FIG. 1, shown mounted in the measurement system frame.
Figure 5B:
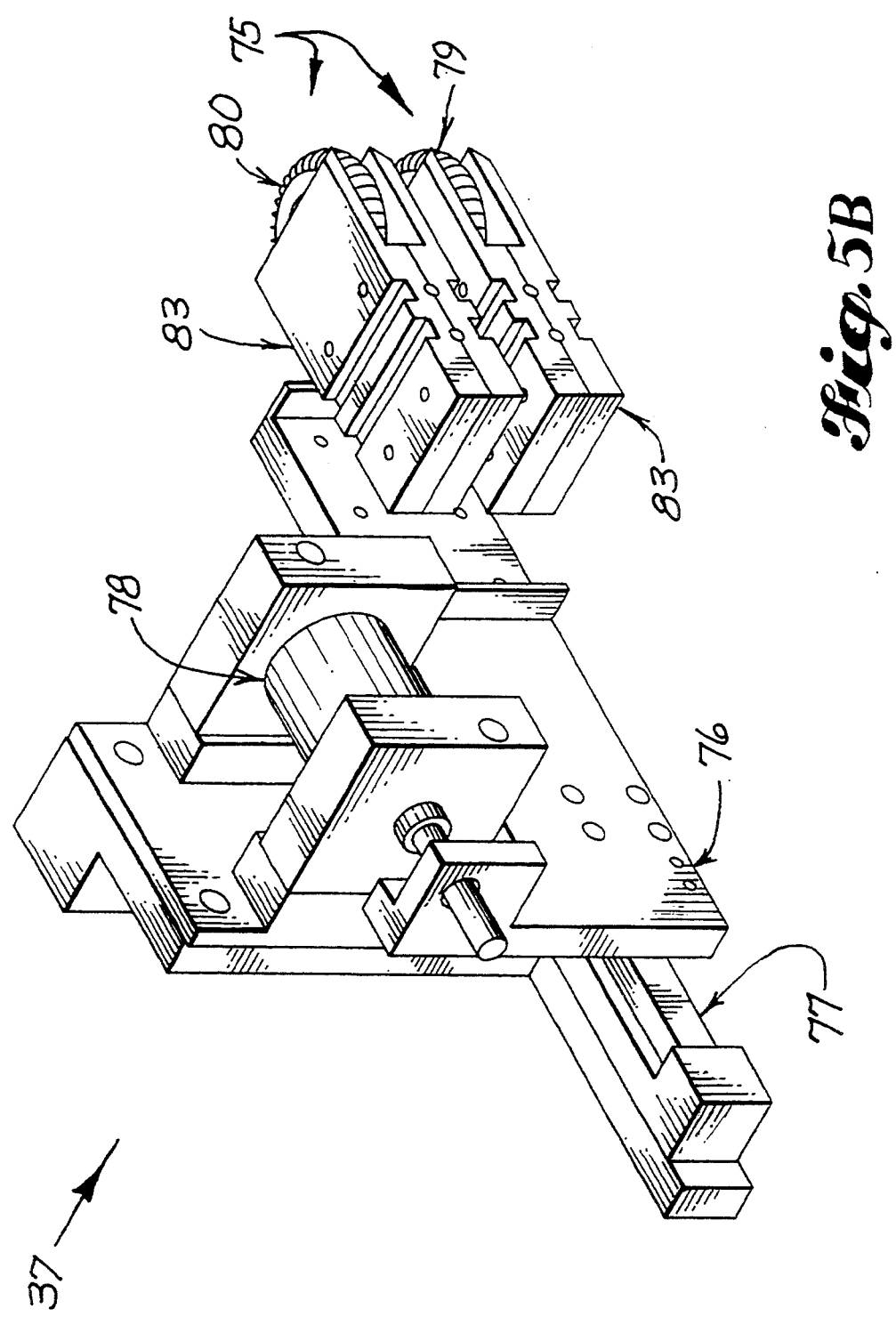
FIG. 5B is an enlarged isometric view of the web thickness measurement module shown in FIG. 5A.

The web thickness modules 37 shown in FIGS. 5A and 5B contact the part 31 in the same cross sectional plane as the angularity sensor 36. Attaching both web thickness sensors 75 to a table 76 on the main carriage 77 allows the sensors to move toward or away from the part 31. The vision actuation system that triggers pneumatic control of the angularity sensor 36 also triggers a separate pneumatic cylinder 78 to force the web thickness sensor 75 to advance toward the part 31.

Slider tracks (not shown) connect two individual web thickness probes 79 and 80 to the table 76. A spring biases each probe 79 and 80 toward the member 31 along the slider track. An LVDT 82 (shown only in FIG. 11) signals distance traveled along the slider track. The LVDT core (not shown) is connected to the probe's frame 83, and a bracket (not shown) secures the LVDT housing (not shown) to the sensor table 76. As the probes 79 and 80 move along the slider track with undulations in the part 31, the LVDT core correspondingly moves within its housing creating an analog electrical signal that an analog-to-digital processor can convert into measurements.

Similar to the angularity sensor 59 described above, as the end of the part 31 passes the web thickness probes 79, probe springs (not shown) bias the probes 79 toward the inward end of the probe tracks 81. The continued travel of the part 31 past the infra red vision sensor (not shown) which, as described above, triggers retraction of the pneumatically actuated angularity sensor 59 and simultaneously triggers retraction of the pneumatically actuated web thickness sensor 75. Thus, the angularity sensor 59 and the web thickness sensor 75, which lie in the same cross sectional plane, move toward or away from the part 31 at approximately the same time.

Figure 6:
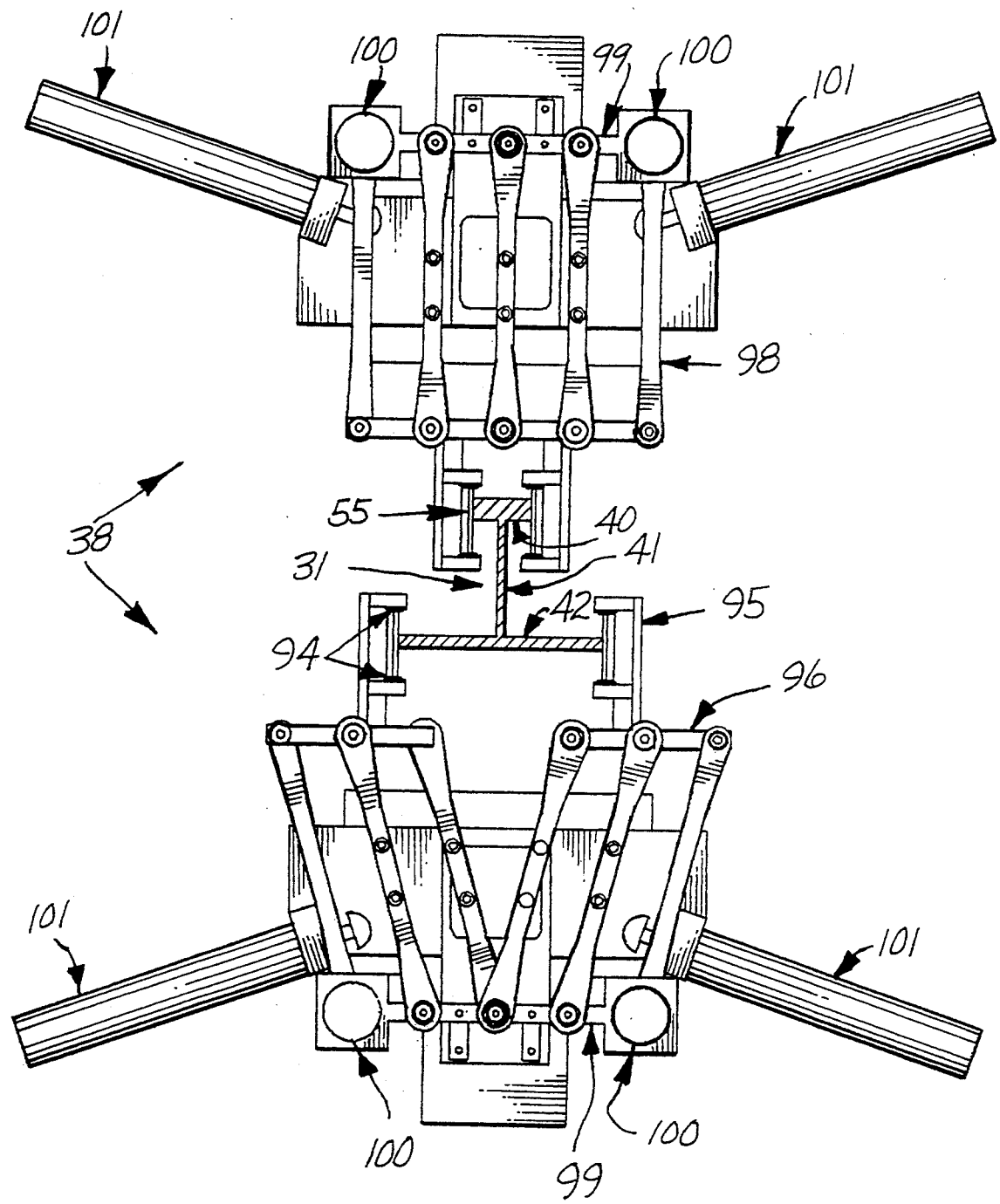
FIG. 6 is an end elevation, partly in cross section, of the upper and lower flange width measurement modules in contact with the member.
Figure 7:
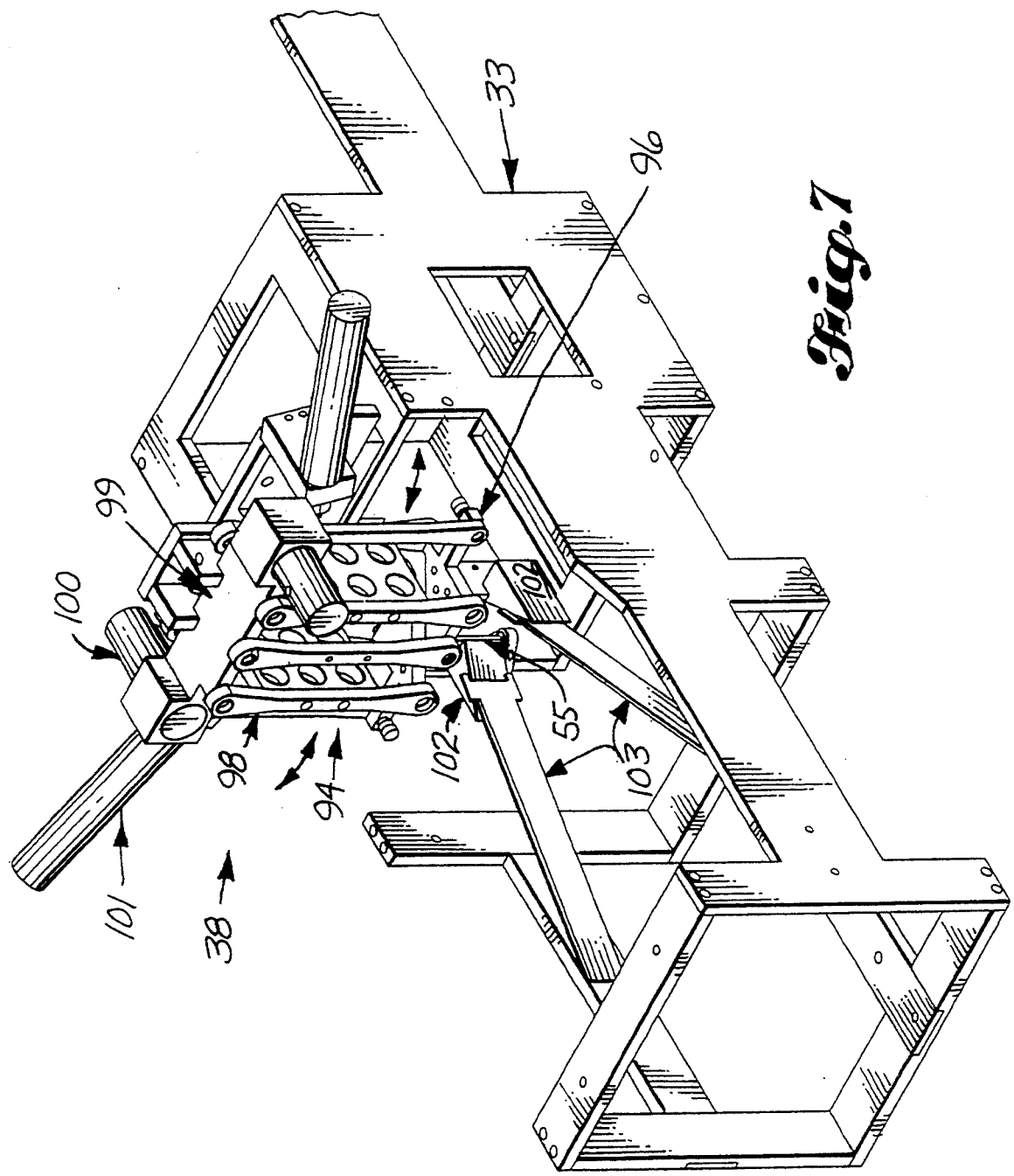
FIG. 7 is an isometric view of the upper flange width measurement module, shown in FIG. 6, in the frame with the sensor spreader system.

The flange width measurement module 38, shown in FIGS. 6 and 7, uses contact probes 55 attached to a parallelogram structure, rather than using a compound slide track system for allowing a probe to make contact with the part 31. The parallelogram structure allows the probe 55 to remain parallel to the flange edge but swing toward or away from the part 31 as the flanges 40 and 42 change in width. The plane in which the flange width probes 55 move is a single cross sectional plane of the part 31 adjacent the contact point of the longitudinal flatness probe 87.

Each flange 40 and 42 contacts a rollable probe 55 that bearings 94 secure in a probe housing 95. It is desirable to use a small diameter probe 55 to accurately measure small undulations in the geometry of the flanges 40 and 42. A small diameter probe 55 allows the probe 55 to contact the flanges 40 and 42 closest to the sensor's 94 plane of motion, which is the part cross section to be measured. The probe 55 contact point will not be the part 31 cross sectional plane intended for measurement if a nearby part 31 cross sectional plane is closer to the probe's 55 axis of rotation. This condition is likely near tabs or cutouts in the flange. A smaller diameter probe 55 insures part 31 contact nearer the desired part 31 cross sectional plane, and thus a more accurate measurement.

Fasteners attach the probe housing 95 to a bottom parallelogram plate 96. Bearings 97 attach the parallelogram plate 96 to four swing arms 98, which are approximately two inches in length. The swing arms 98 must be equal in length and attached to a single support bracket 99. Three of the swing arms 98 insure that the bottom plate 96 remains parallel to the support bracket 99 throughout its possible range of motion. The fourth swing arm 98 serves an additional function. A rotational variable differential transformer (RVDT) 100 is attached to the support bracket 99 and centered about the axis of rotation of the fourth swing arm 98. The RVDT 100 creates an electronic signal that accurately represents the displacement angle of the swing arm 98. Because the bottom bracket 96, probe housing 95, probe 55, and swing arm 98, collectively referred to as the flange width measurement sensor 94, all move in conjunction, the signal processor may easily convert the sensor's 94 rotational displacement into a flange width measurement.

Also in contact with the fourth swing arm 98 is a pneumatic cylinder 101. The pneumatic cylinder 101 applies a constant force to the movable portion of the flange width measurement sensor 94, biasing the sensor 94 toward the part 31. This biasing force insures that the contact probe 55 and the flanges 40 and 42 are in constant contact.

The approaching part 31 mechanically opens the flange width sensors 94. The probe housing 95 is attached to a small wedge shaped block 102. The triangular wedge 102 extends from the housing 95 to a point just past the probe's 55 center point and angles to allow the leading edge of the part 31 to slide along the wedge 102, forcing the flange width sensors 94 apart. If the wedge 102 angle is too steep, the approaching part 31 will force the probes 55 to bend in the direction of member 31 motion rather than swing apart into proper position for measuring. If the wedge 102 angle is too shallow, the wedge 102 may ride against the tabs on the flanges 40 and 42 and cause erroneous measurements. The preferred wedge 102 angle is about forty-five degrees.

To minimize the size of the wedge 102, panels 103 hingedly affixed to the frame 33, which ride on the wedge's 102 leading edge, initiate sensor 94 spreading when the part 31 pushes against the panels 103. As the part 31 feeds through the frame 33 toward the flange width measurement module 38, the part 31 first contacts the panels 103 which begin spreading the flange width measurement probes 55. As the part 31 passes the point where the panels 103 contact the wedge 102, the part 31 spreads the sensors 94 by sliding along the wedge 102. The part 31 then rolls between the probes 55.

Turning briefly to FIG. 1A, the system has two clamping modules 39 and a drive system 30 which contact but do not measure the part 31. The drive system 30 consists of two sets of wheels 105A upstream (in the sense of part motion) of the frame 33 and two sets 105B downstream of the frame 33. The drive wheels 105 have a compressible high friction contact surface and are adjacent the part web 41. As a part 31 feeds between the wheels 105, they securely contact it. A variable servo motor 104 rotationally drives the wheels 105. The upstream set of these wheels 105A drive the part through the frame and the downstream set 105B pulls the part 31 out of the frame 33.

Figure 8:
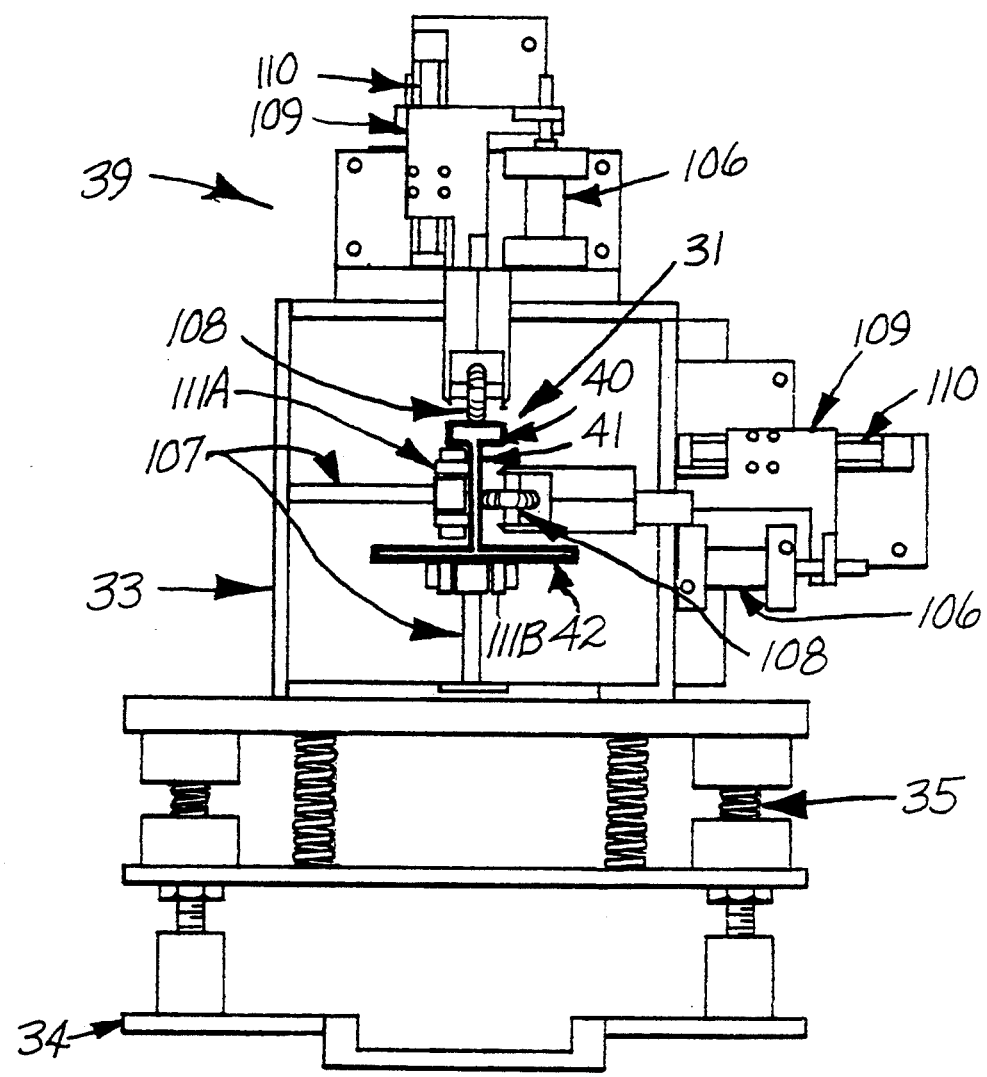
FIG. 8 is an end view of the clamping module shown in FIG. 1.
Figure 9:
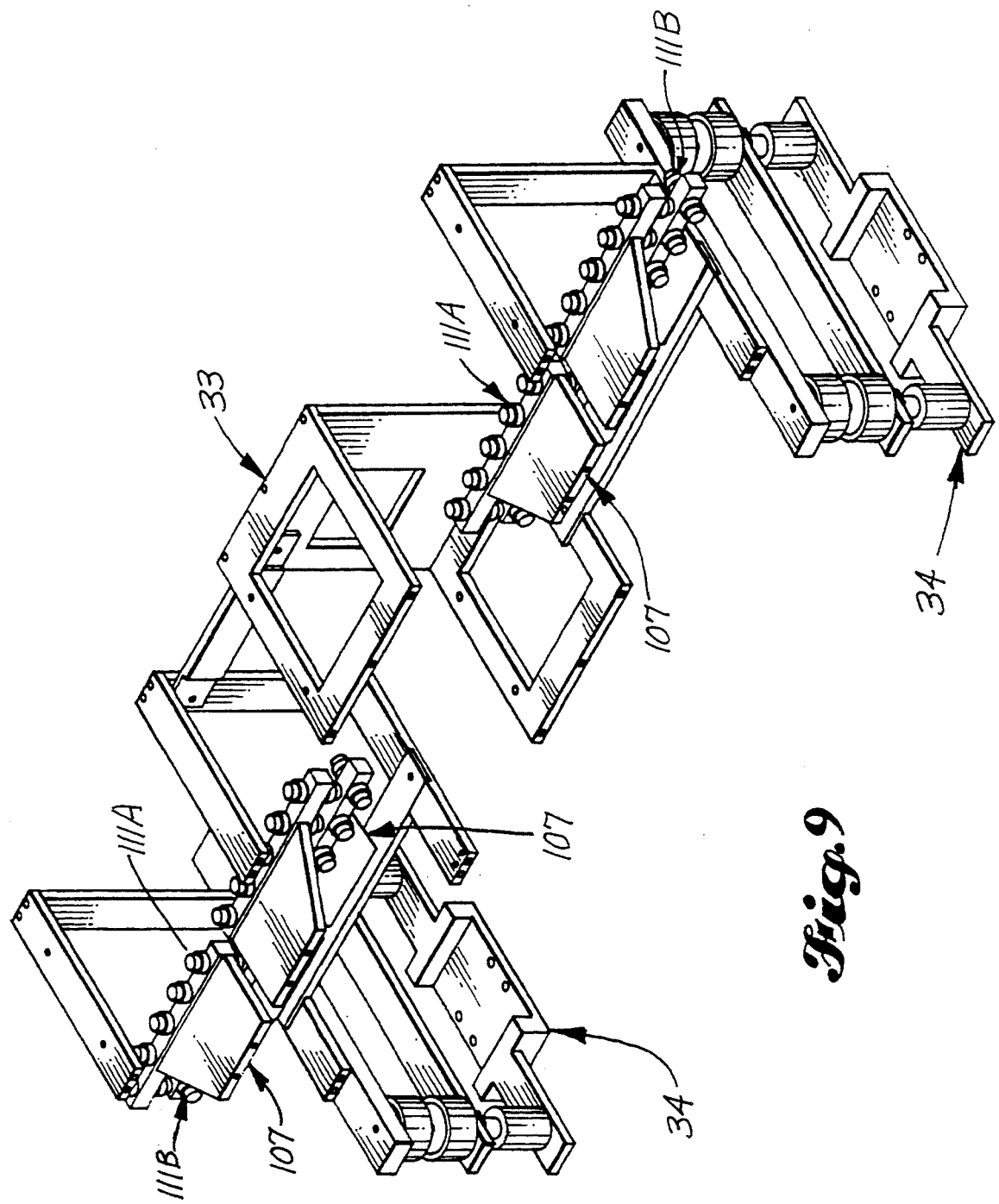
FIG. 9 is an isometric view of the a partially cut away frame shown in FIG. 1, illustrating the rigid wheels of the part clamping module.
Figure 10:
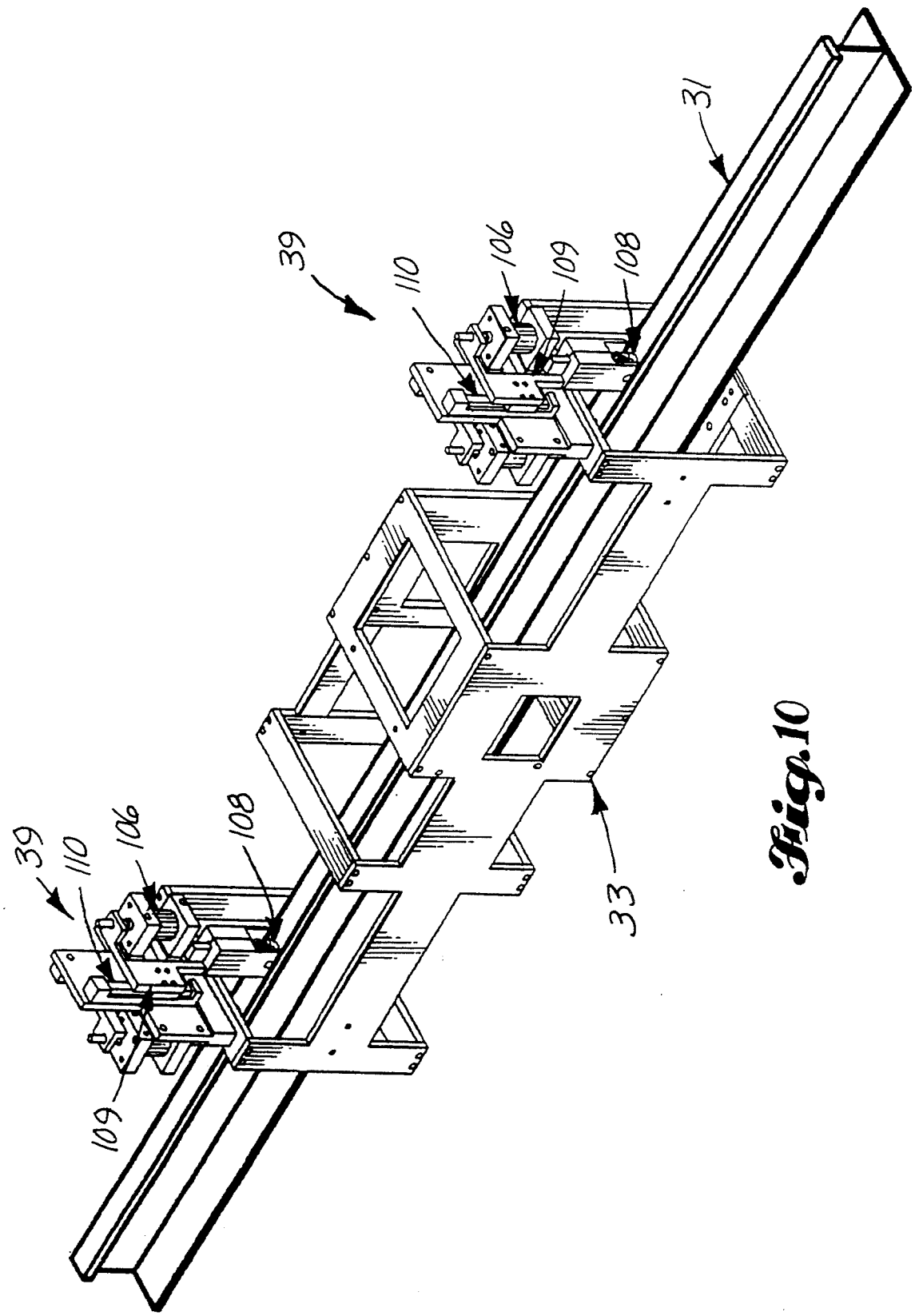
FIG. 10 is an isometric view of the two part clamping modules clamping a part in the frame.

Clamping modules 39, shown in more detail in FIGS. 8, 9, and 10, at either end of the frame 33 rigidly clamp the part 31 in a known plane as it enters and leaves the frame 33. At either end of the frame 33, two sets of data plane location devices are positioned, including rolling wheels 111Am abnd 111B, are rigidly attached to housings 107, which are rigidly attached to the frame 33, as shown in FIG. 9. One set of wheels 111A provides hard rolling contact with a vertical plane, the web 41. The other set of wheels 111B provides hard rolling contact with a horizontal plane, the lower flange 42. As shown in FIG. 10, opposed to each set of rigid wheels 111B is a wheel 108 attached to a table 109 on a carriage 110. The table 109 and wheel 108 is reciprocal toward and away from the member 31. A pneumatic cylinder 106 attached to the frame drives the reciprocal clamping wheel 108 toward the rigid wheels 111B. After the part 31 feeds past the front clamping module 39, an infra red vision sensor (not shown) detects the presence of the part 31. This vision system (not shown) triggers pneumatic cylinder 106 actuation, and the vertical and horizontal clamping wheels 108 drive the part 31 against the rigid wheels 111B. Thus, the part 31 is rigidly located relative to the frame 33 in two axes. An identical clamping module 39 is at the exiting end of the frame 33. The vision system (not shown) for the exiting clamping module 39 is located on the exiting side of the clamping wheels 111.

Figure 11:
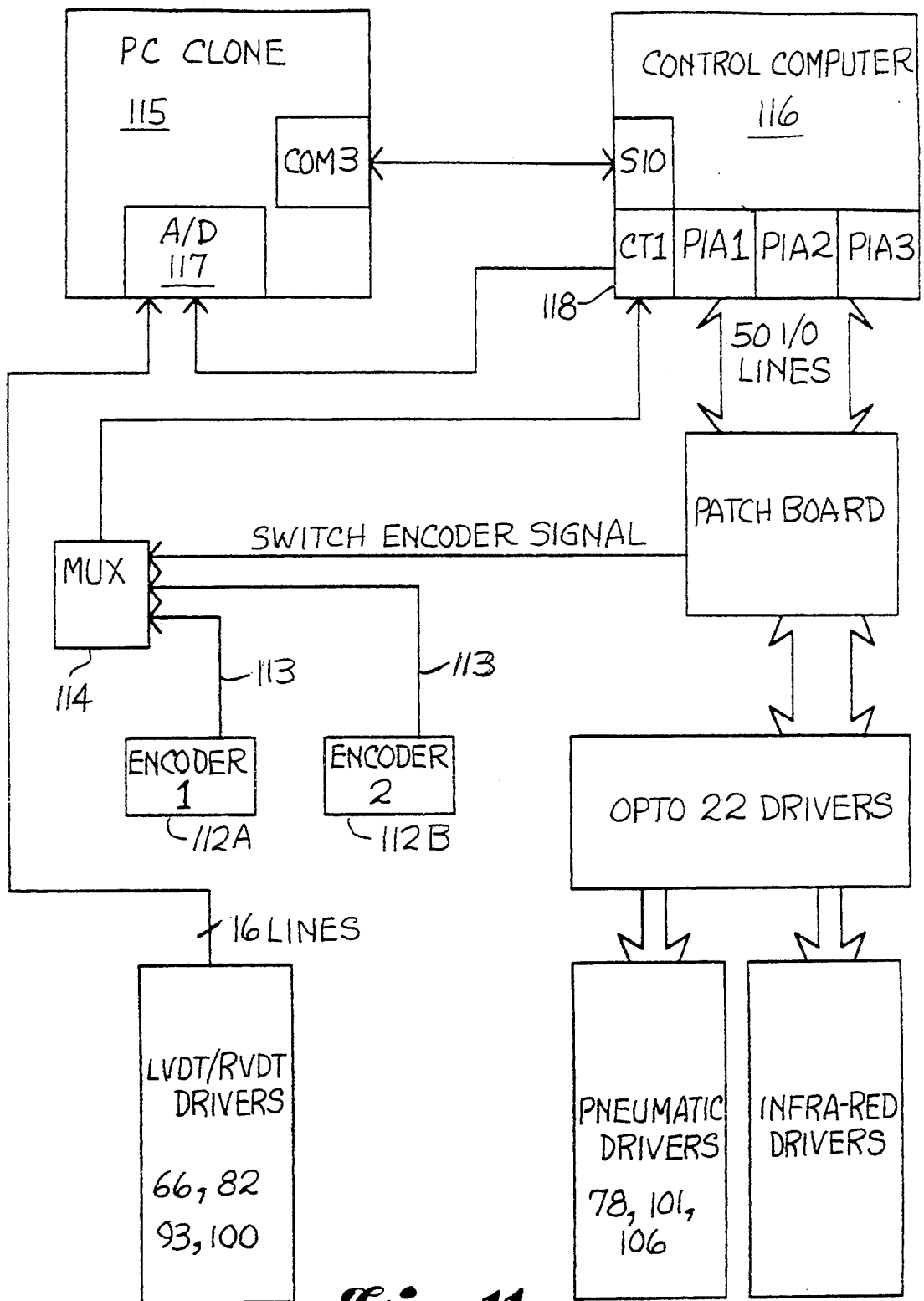
FIG. 11 is a schematic of the signal processing system.
Figure 12:
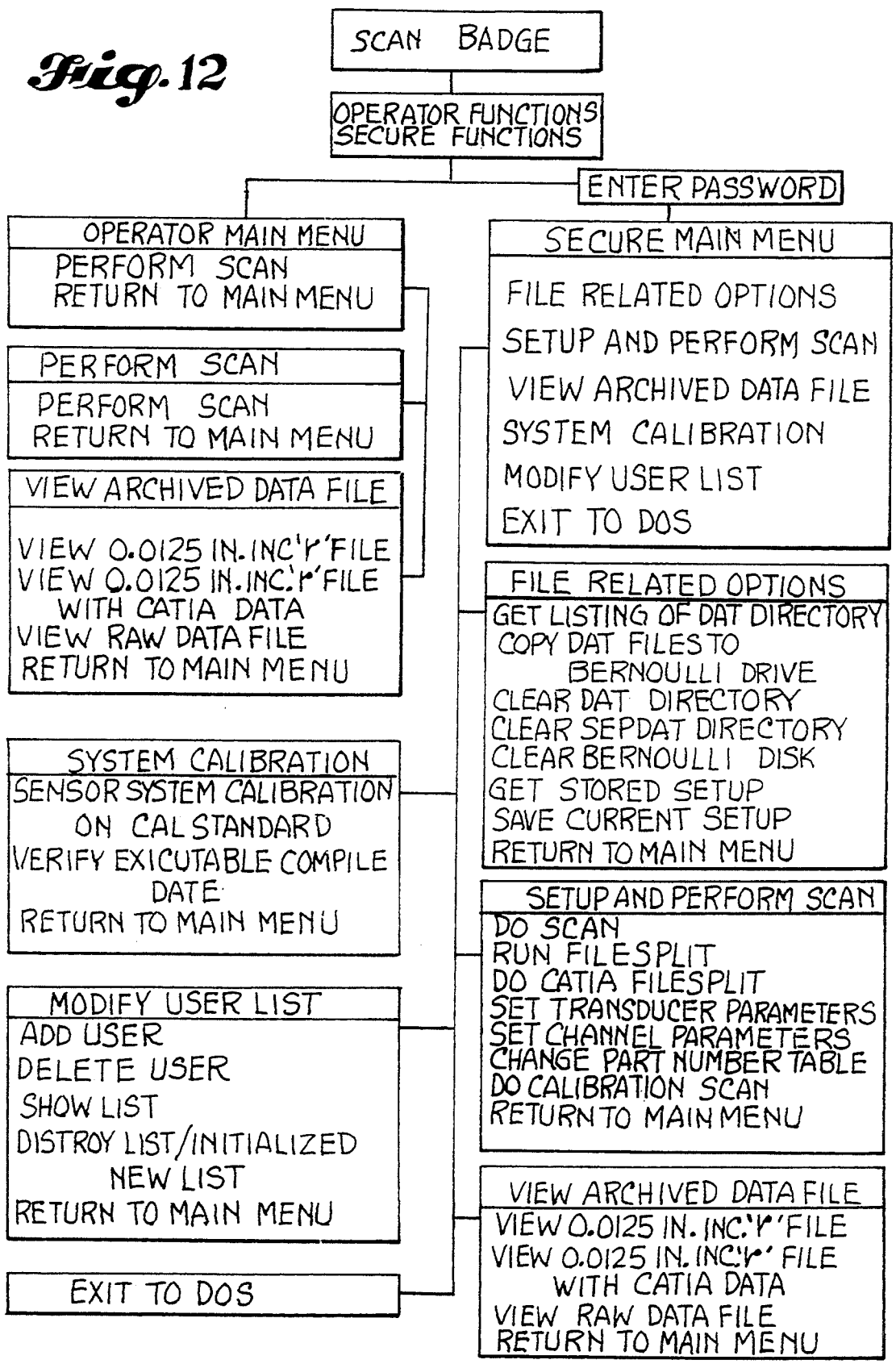
FIG. 12 is a schematic of the computer program menu options.

As shown in FIG. 11, a data acquisition computer such as a personal computer 115 (hereinafter PC), in conjunction with a 68000-based micro-controller 116, control and monitor the entire measurement process. The PC 115 provides operator interface, data analysis, and data storage capability. To initiate a part 31 measurement process, the operator keys in or scans in using a bar code reading device (not shown) the part number and related information. The PC 115 checks for the existence of the part number in a part number table to verify that the input number and the database part number are identical. If not, the PC 115 informs the operator by a message on a monitor, or visual terminal 118, associated with the PC 115, of the failure to find a database match and ends the scan function.

If a part dimensional design definition database file exists, the PC 115 creates a part file and stores system parameters including part dimensional design definition data defining the cross sectional dimensions of the part, and the tolerances thereon as a function of the longitudinal dimensions along the part in a header at the start of the file. The PC 115 prompts the operator to reset the micro-controller 116 and upon successful reset, to load the part 31 into the roller stand 32 in a given orientation. After the operator loads the part, tapping any key on the PC 115 initiates the measurement process. In the measurement process, the data acquisition computer 115 is programmed to assimilate the sensed part cross sectional dimensions and the sensed part longitudinal dimensions, and compare those sensed dimensions against the part dimensional data received from the dimensional design definition database. The PC 115 sends a "go" code to the micro-controller 116 and the micro-controller 116 replies with an "OK" code. A multiplexer 114 receives a square wave signal 113 from the front length encoders 112A and 112B and the micro-controller 116 scans all sensors at every second wave. Because the LVDT sensors 66, 82, 93, and 100 create analog electrical signals indicative of the displacement from the data plane of the part surfaces that their probes contact, an analog-to-digital conversion board 117 allows the micro-controller 116 to convert the LVDT's signals to dimensional measurements and produce signals indicative of the displacement of the part surfaces from the data reference planes, constituting cross sectional dimension data, and transmit the measurements to the PC 115 in digital form. The micro-controller 116 clears and reprograms the encoder interface boards. The micro-controller 116 begins sensor scanning and control functions of the pneumatic cylinders 78, 101, and 106.

The PC 115 sets up a scan screen with four strip charts and information about the part 31, channels, and file. The operator turns the transport motors on and feeds the part 31 into the drive wheels 30. As the part 31 turns the encoder wheel 112, the micro-controller 116 divides the number of square wave pulses 113 by two and initiates output to the analog-to-digital converter 117. The encoder interface board 118 sums the raw output of each encoder 112. The square wave output 113 triggers the analog-to-digital board 117. At each cycle the analog-to-digital board 117 digitizes all sixteen channels and stores the result in its local buffer. Thus, the encoder 112 interface counts predetermined small length increments (as determined by the size of the encoder wheel 112 and encoder resolution), but the analog-to-digital board 117 divides by two and therefore the instrument measures in increments of one half of the predetermined size. When the buffer of the analog-to-digital board 117 gets full, it signals the PC 115, which then transfers the buffer to a buffer in the PC 115 and resets the analog-to-digital buffer. Each time the buffer is transferred, the PC 115 draws the received data into the appropriate strip chart. When the PC's 115 buffer is full, the PC 115 dumps the buffered data to a hard disk in the PC 115 and resets the buffer. The digitizing and buffer linking process continues until the final end of the part 31 passes through the instrument.

As the part 31 passes appropriate infra-red vision sensors (not shown), the micro-controller 116 initiates pneumatic cylinder 78, 101, or 106 pressure closing the appropriate module. As the part 31 passes the second encoder 112 and the last infra-red vision sensor, the micro-controller 116 switches the multiplexer 114 from outputting the first encoder's square wave 113 to outputting the second. As the end of the part 31 passes certain infra-red vision sensors, the micro-controller 116 signals the appropriate pneumatic cylinders 78, 101, or 106 to open. By releasing pneumatic clamping module pressure 106 gradually before the passage of the end of the part 31 through the module 39, the system avoids creating vibrations that could affect dimensional measurement still in progress. Measurement modules are permitted to ride off the end of the part 31 in order that the end of the part 31 be measured. When the part 31 passes the last infra-red vision sensor, the micro-controller 116 signals the PC 115 and sends the contents of the encoder summation register to the PC 115.

Upon receipt of the completion signal, the PC 115 transfers all buffers, closes the data file, and asks if the operator desires a file split with CATIA, a computer aided design system. The analog-to-digital board 117 digitizes the sixteen dimensional sensor channels in sequence and buffers the digital data. Thus the buffer, and finally the data file, contain data from all channels loaded with the last channel of one position followed by the first channel of the next position and so on. The file split separates the data into sixteen files of one channel data stored at small linear increments and four sets of four files for the flange width channels recorded at minute increments.

The PC 115 requests the operator to select video or automatic determination of the end of the part 31. The video end determination option allows the operator to choose the end of the member 31 by viewing the data file in case the automatic end detection algorithm is inaccurate. If the operator chooses the automatic end detection option, the PC 115 runs the file split program.

The program begins by finding the end of the part 31 from the recorded data based on the part number. This is important because all length determinations are based on the zero point of the part 31. The PC 115 reads data from the file's beginning. This data equates to the outboard end of the part 31. Although the buffer receives data starting at the front of the part 31, the buffer is filled from back to front reversing the order of each buffered increment of data so the PC 115 must reverse the order of each buffer increment downloaded to it. The analog-to-digital board 117 converts the data from raw LVDT 66, 82, 93, 100 voltage to inches at this point.

The part 31 end detection algorithm works by comparing the data set received from the sensors to that received on average from the four previous points. When this comparison exceeds a certain known constant, it indicates that the part 31 is forcing the flange width sensors 94 outward and meaningful data is about to be produced. When this occurs, it effectively identifies the end of the part 31 and the data file is marked by substituting an arbitrary value unobtainable with the sensors into the data file. The data file writing process is the same for the other width data sets. The remaining channels are processed the same way as the width channels except that the data is written at larger increments because the added resolution has not been required.

Once the data is split, the program proceeds to compare the CATIA data file. This function opens each of the width channel files and the corresponding CATIA file. It then subtracts each collected datum point from the corresponding CATIA point. If the difference is greater than the tolerance, the PC 115 buffers that point with the values and differences for a report. The PC 115 places data from tightly radiused flange areas in a separate file representing flange tabs. The PC 115 then compares flatness module channels to identify flange angularity defects or longitudinal defects (bumps). For the web 41, the PC 115 program compares the web width module 37 channels to the known web 41 plane to determine a lack of normality condition and to detect bumps. As the program identifies out-of-tolerance conditions, it buffers the location and magnitude of the defect. The program compiles the defects from its buffer and generates reports and writes the data to exception report files. The operator can request the PC 115 to print a hard copy of the exception report files.

One skilled in the art may conceive ways to vary, modify, or adapt the preferred embodiment disclosed herein. Therefore, it is to be understood that these variations, modifications, and adaptations, and the equivalents thereof, may be practiced while remaining within the spirit and scope of this invention as defined in the following claims, wherein

I claim:

1. An apparatus for continuously measuring a plurality of dimensions of a part having a cross section and a longitudinal axis, said cross section being composed of substantially linear components, comprising:
   a frame attached to a suitable supporting structure having frame attachment points, said attachment points having spring type suspension components which semi-fixedly support and locate said frame upon said supporting structure;
   said frame surrounding a transport zone along which the part is transported and having data plane location devices being fixedly attached to said frame and providing substantially rigid slidable contact with no less than two of said linear cross sectional components, said cross sectional components being substantially orthogonal, said data plane location device comprising transportation devices slidably mounted to said frame and having a tangential member contact surface coplanar with and in the direction of desired member longitudinal motion;
   a drive unit for moving said part along said transport zone through said frame in the direction of said longitudinal axis;
   a plurality of carriages reciprocable on said frame toward and away from said part, said carriages having actuators for reciprocably moving said carriages toward and away from said part transport zone;
   a sensing assembly on said carriage for continuously measuring the part dimensions, said sensing assembly comprising;
      a) a movable contact assembly reciprocable in said carriage toward and away from the part dimension;
      b) a probe attached to said contact assembly contacting the part;
      c) a drive system for moving said contact assembly toward and away from said dimension;
      d) a measurement device for measuring the motion of said probe relative to said carriage:
   whereby said sensing assembly continuously measures a plurality of dimensions on said part while said drive unit moves said part through said transport zone.

2. An apparatus as defined in claim 1 wherein said sensing assembly measures the cross sectional linear component flatness of the part, said cross sectional flatness sensing assembly comprising:
   a first sensing assembly having a plurality of probes biased toward said part transport zone at an equal plurality of points along said cross sectional linear component, said probes being rotationally or retractably mounted to said contact assembly.

3. An apparatus as defined in claim 1 wherein said sensing assembly measures longitudinal flatness of said cross sectional linear component, said longitudinal flatness sensing assembly comprising:
   a single pin rollably or slidably contacting a substantial portion of said cross sectional linear component and being rotationally or retractably mounted to said contact assembly.

4. An apparatus as defined in claim 2 further comprising:
   a second sensing assembly measuring linear cross sectional component width, said width sensing assembly comprising a probe oriented toward said part transport zone at a point along said member's cross sectional linear component substantially directly opposite a probe of said first sensing assembly.

5. A method of measuring selected cross-sectional dimensions of a part, comprising the steps of:
   selecting a part having cross section and a longitudinal axis along which said cross section may vary somewhat in size and shape, said cross section being composed of substantially linear components;
   feeding said part into a frame along a path of motion wherein;
      a) said frame surrounds a portion of said path of motion and has data plane location devices fixedly attached to said frame and providing substantially rigid slidable contact with no less than two of said linear cross sectional components, said cross sectional components being substantially orthogonal, said data plane location device comprising transportation devices slidably mounted to said frame and having a tangential member contact surface coplanar with and in the direction of desired member longitudinal motion;
      b) said frame having a plurality of carriages reciprocable on said frame toward and away from said path of motion, said carriages having actuators for reciprocably moving said carriages toward and away from said part;
   supporting said frame upon a supporting structure having frame attachment points, said attachment points having spring type suspension components which semi-fixedly support and locate said frame upon said supporting structure;
   driving said part through said frame;
   continuously measuring said dimensions using a sensing assembly rigidly attached to said carriage, said sensing assembly comprising;
      a) a movable contact assembly reciprocable in said carriage toward and away from said dimension;
      b) a probe attached to said contact assembly contacting said part;
      c) an actuator for moving said contact assembly toward and away from said dimension;

d) a measurement device for measuring the motion of said probe relative to said carriage;

whereby said measurement device of said sensing assembly measures displacement of said probe from said data plane to produce measurement data of said selected cross-sectional dimension of said part.

6. A method of measuring as defined in claim 5 wherein:

measuring said cross sectional linear component flatness with a first sensing assembly using a sensing assembly having a plurality of probes contacting said member at an equal plurality of points along said cross sectional linear component, said probes being rotationally or retractably mounted to said contact assembly.

7. A method of measuring as defined in claim 5 wherein:

measuring longitudinal flatness of said cross sectional linear component using a single pin rollably or slidably contacting a substantial portion of said cross sectional linear component, said pin being rotationally or retractably mounted to said contact assembly.

8. A method of measuring as defined in claim 6 wherein:

measuring a linear cross sectional component width by contacting the part with a probe at a point along said cross sectional linear component substantially directly opposite a probe of said first sensing assembly.

9. For use in connection with an elongated part having a cross section perpendicular to a longitudinal axis of said part over which said cross section may vary, a part measurement system for automated part dimension inspection comprising:

a data acquisition computer;

a frame surrounding a transport zone along which the part is transported and having data plane location devices for establishing reference data planes, said devices being fixedly attached to said frame for providing substantially rigid hard contact with two substantially orthogonal surfaces on said part;

a drive unit for moving said part along said transport zone through said frame in the direction of said longitudinal axis;

dimensional sensing instruments electrically coupled to said computer and mounted on said frame opposed to said part for continuously sensing displacement of said part surfaces from said data planes while said part is moving along said transport zone, to yield cross-sectional dimension measurements of said parts, and for producing signals indicative of said measurements;

a longitudinal movement measuring instrument for measuring longitudinal movement of said part through said transport zone and producing signals indicative of said longitudinal movement; programming means operable to cause said data acquisition computer to receive from said dimensional sensing instruments and said longitudinal movement measuring instrument said sensed longitudinal movement signals and said part's cross sectional dimensions signals and operable to assimilate said longitudinal movement and said cross sectional dimensions signals.

10. A part measurement system as defined in claim 9 wherein:

said measurement system includes at least one visual terminal operatively connected to said data acquisition computer for permitting a measurement system user to receive part's sensed dimensions.

11. A member measurement system as defined in claim 9 wherein:

said data acquisition computer records said part cross sectional dimensions taken at regular longitudinal intervals.

12. A part measurement system as defined in claim 9 further comprising:

a part dimensional design definition database defining said part cross sectional dimensions as a function of said longitudinal dimension;

programming means operable to cause said data acquisition computer to receive from said dimensional design definition database part dimensions and operable to assimilate said sensed part cross sectional dimensions, said sensed longitudinal dimensions, and said design database dimensions.

13. A part measurement system as defined in claim 12 wherein:

said measurement system includes at least one visual terminal operatively connected to said data acquisition computer for permitting a measurement system user to receive sensed dimensions in relation to said design database dimensions.

14. A part measurement system as defined in claim 13 wherein:

said received dimensional information is displayed on said visual terminal comprising a graphical representation of sensed dimensions in relation to said design database dimensions.

15. A part measurement system as defined in claim 12 wherein:

said dimensional design definition database further defines said part cross sectional tolerances as a function of said longitudinal dimension.

16. A part measurement system as defined in claim 15 wherein:

said measurement system includes at least one visual terminal operatively connected to said data acquisition computer for permitting a measurement system user to receive sensed dimensions in relation to said design database cross sectional tolerance dimensions.

17. A part measurement system as defined in claim 16 wherein:

said received dimensional information is displayed on said visual terminal comprising a graphical representation of sensed dimensions in relation to said design database cross sectional tolerance dimensions.

18. A method for measuring selected dimensions of an elongated part using a processing system for automated inspection of a part having a cross section perpendicular to a longitudinal axis over which said cross section may vary, comprising the steps of:

moving said part through a transport zone having location devices for establishing data planes, and having dimensional sensing instruments for sensing both longitudinal movement of said member and displacement of selected surfaces of said part from said data planes;

continuously sensing both longitudinal movement of said member and displacement of selected surfaces of said part from said data planes with said location devices and said dimensional sensing instruments while said part is moving through said transport zone;

producing signals indicative of said longitudinal movement of said part through said transport zone, constituting longitudinal measurement data, and of said displacement of said surfaces from said reference planes, constituting cross sectional dimension data;

transmitting said signals to a data acquisition computer;

assimilating said signals in said data acquisition computer and manipulating said signals in software in said computer to record said cross sectional dimension data correlated together with said longitudinal measurement data.

19. A method for measuring as defined in claim 18 wherein:

said measurement system displays said sensed dimensions on a visual terminal which is operatively connected to said data acquisition computer.

20. A method for measuring as defined in claim 18 wherein:

said data acquisition computer records said cross sectional dimensions taken at regular longitudinal intervals.

21. A method for measuring as defined in claim 18 further comprising the steps of:

creating a part dimensional design definition database defining said part cross sectional dimensions and tolerances thereon as a function of member's said longitudinal dimension;

programming said data acquisition computer to receive from said dimensional design definition database part dimensions assimilating said sensed part cross sectional dimensions, said sensed part longitudinal dimensions, and said design database dimensions.

22. A method for measuring as defined in claim 21 further comprising the step:

displaying said sensed dimensions in relation to said design database dimensions on a visual terminal which is operatively connected to said data acquisition computer.

23. A method for measuring as defined in claim 22 wherein:

said display is a graphical representation of said sensed part's dimensions in relation to said design database dimensions.

* * * * *